April 18, 1961   A. N. ALLEN, JR., ET AL   2,980,188
COMBINED FEATHERING AND PITCH LOCK SYSTEM
Filed Nov. 14, 1958
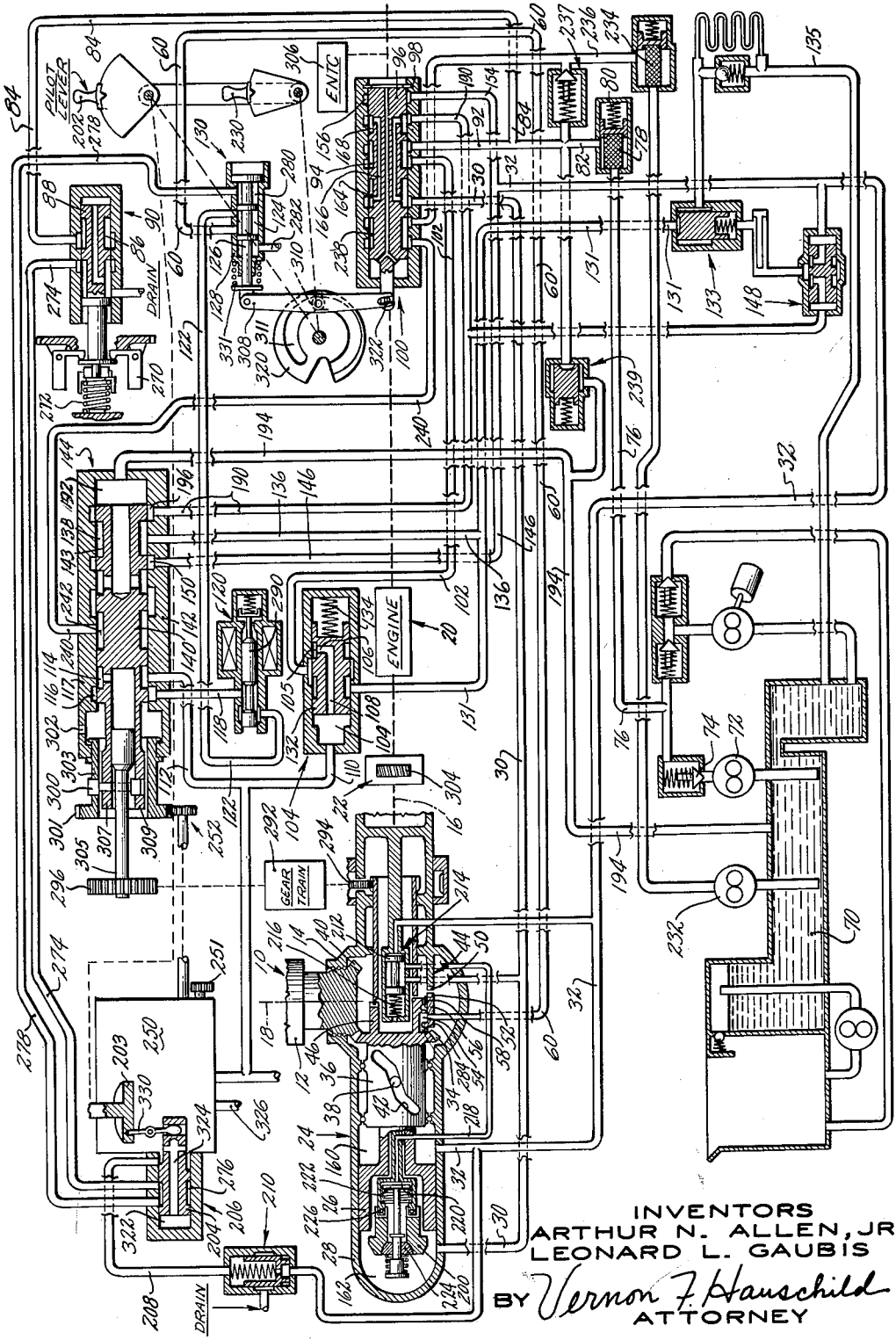
INVENTORS
ARTHUR N. ALLEN, JR.
LEONARD L. GAUBIS
BY Vernon F. Hauschild
ATTORNEY

United States Patent Office 2,980,188
Patented Apr. 18, 1961

2,980,188

COMBINED FEATHERING AND PITCH LOCK SYSTEM

Arthur N. Allen, Jr., Wethersfield, and Leonard L. Gaubis, Granby, Conn., assignors to United Aircraft Corporation, East Hartford, Conn., a corporation of Delaware Filed Nov. 14, 1958, Ser. No. 774,065

9 Claims. (Cl. 170—160.2)

This invention relates to variable pitch propellers of the aircraft type and more particularly to apparatus and control mechanisms for varying propeller blade pitch and locking the propeller blades in pitch.

It is an object of this invention to provide a propeller pitch lock which is normally disengaged hydraulically and which is engaged by one of seven means including propeller overspeed, loss of hydraulic pressure in propeller control system, a manually energized solenoid valve, distributor valve actuation by a propeller follow-up control, negative torque between the propeller and the engine, pilot lever position and pilot actuated panic handle.

It is a further object of this invention to teach a control mechanism for engaging normally hydraulically disengaged propeller pitch lock means comprising a propeller overspeed topping governor cylinder, a manually operated solenoid valve and the pitch change motor distributor valve in series so that the translation of any of these three valves will bleed the propeller pitch lock hydraulic disengaging system, thereby engaging the propeller pitch lock.

It is a further object of this invention to provide a propeller pitch lock and feather control in which the propeller overspeed governor, which normally functions to engage the propeller pitch lock and actuate the emergency feathering valve, is made inoperative or isolated from the remainder of the system during propeller reverse pitch operation to prevent engagement of the propeller pitch lock and actuation of the emergency feather valve thereby.

Other objects and advantages will be apparent from the specification and claims, and from the accompanying drawings which illustrate an embodiment of the invention.

The figure is a schematic representation of the combined propeller blade pitch change and pitch lock system.

Referring to the figure we see variable pitch hydraulic propeller unit 10 which comprises a plurality of blades 12 which are supported by hub 14 to be rotatable about propeller axis 16, thereby performing a thrust generating function and also to be rotatable about blade axis 18 to vary propeller blade pitch angle. Propeller unit 10 is more fully described in U.S. Patent Nos. 2,280,713 and 2,758,659 and reference may be made thereto for a detailed description thereof and is preferably coaxial with and driven by aircraft engine 20 and speed reduction gear 22, more fully described in U.S. Patent No. 2,711,631 and reference may be made thereto for a detailed description thereof, such that engine 20 drives propeller unit 10, preferably at a reduced speed through speed reduction gear 22. It should be borne in mind that innumerable propeller unit and engine configurations could be used besides the preferred embodiments incorporated by reference without departing from the scope of our invention. Propeller blades 12 are caused to change pitch and hence vary propeller speed by the action of propeller pitch change motor 24 which comprises hydraulic piston unit 26 which reciprocates and rotates within propeller dome or cylinder 28. Hydraulic actuating fluid is introduced to propeller pitch change motor either through high pitch line 30 or low pitch line 32 to cause piston 26 to translate within dome 28 and to cause gear 34 to rotate with sleeve 36 due to the action of cam roller unit 38 which connects piston 26 to rotatable sleeve 36 in such a fashion that roller unit 38 may translate and hence causes gear 34 to rotate. Gear 34 engages beveled gear 40 at the base of each propeller blade 12 to insure simultaneous pitch change as the reciprocation of pitch change motor piston 26 causes the rotation of blades 12 about axis 18 and hence varies the blade pitch angle, thereby varying the propeller resistance to rotation and power absorption characteristics. When propeller blades 12 are in their maximum pitch angle or full feather position, they offer maximum resistance to rotation. As propeller blades 12 rotate toward a negative pitch position they must pass through a potentially destructive zero degree pitch angle, at which propeller resistance to rotation is at a minimum so that for a given power output from engine 20, the propeller blades 12 will increase in speed, possibly to destruction, if permitted to dwell in this zero degree pitch angle. Since it is necessary for airplane braking purposes, for example, to be able to rotate propeller blades 12 to a reverse pitch position, it is desirable that the propeller blades rotate through this potentially destructive zero degree pitch angle rapidly so the cam 42 is contoured to cause the propeller blades 12 to pivot or rotate through this zero degree pitch angle quickly.

If at a positive pitch blade angle and left to seek their own blade pitch angle, for instance when pitch change motor 24 is malfunctioning, propeller blades 12 would rotate to this minimum rotational resistance and destructive zero degree pitch angle. To prevent this occurrence, pitch lock unit 44 is provided which comprises a ring 50 of fixed teeth attached to propeller hub or barrel 14 and a cooperating or mating ring 52 of teeth which are translatable and rotatable with respect thereto and is carried for rotation by shaft 46 which is attached to sleeve 36. Pitch lock unit 44 has angled teeth which operate in ratchet fashion, when engaged, such that the propeller blade pitch angle may be increased when the gear rings 50 and 52 of the pitch lock unit 44 are in contact and such that, should the propeller blades 12 attempt to rotate in a decreased pitch direction, the teeth of pitch lock rings 50 and 52 will lock to prevent rotation in this pitch decrease direction. This pitch lock 44 action is described more fully in U.S. Patent No. 2,703,148. Since, during normal propeller operation complete flexibility of movement to all blade pitch angles is desired, pitch lock unit 44 is normally disengaged by the introduction of propeller actuating fluid into pitch lock disengaging cavity or chamber 54 which is defined by the contouring of shaft 46 and movable shaft 56 which is concentric therewith and splined thereto by mating splines 58 and which carries movable pitch lock ring 52. As hydraulic fluid from line 60 enters pitch lock disengaging chamber 54, shaft 56 is caused to overcome spring 284 and move toward gear 34 while propeller hub or barrel 14 remains stationary so that gear ring 52 is translated away from and out of contact with its cooperating fixed gear ring 50. Accordingly, when pressurized propeller actuating fluid is present in pitch lock disengaging chamber 54, pitch lock unit 44 is disengaged and inoperative. Further, when pressurized hydraulic fluid is no longer present in chamber 54, for example due to failure of pump 72, gear ring 52 will be returned by spring 284 to engage pitch lock unit 44 and, hence, loss of pressure in the propeller control system actuating fluid will engage pitch lock unit 44.

As mentioned previously, during periods of malfunction or potential malfunction, it is necessary or advisable that propeller blades 12 not be permitted to rotate to their destructive zero degree pitch angle and accordingly, it is desirable to engage pitch lock unit 44. For example, it is desirable to engage pitch lock unit 44 during periods of propeller overspeed, during periods when propeller actuating fluid pressure is lost, during periods when the pilot anticipates potential loss of propeller control due to an impending danger when he might wish to engage the pitch lock unit 44 by means of a solenoid button, pilot lever position or a panic handle, and during periods of negative torque, that is, during periods when the propeller unit 10 is driving the engine 20 instead of vice versa. Under the latter circumstance engine 20 may be malfunctioning and it will therefore be desirable to have blades 12 of propeller unit 10 in their most favorable position.

It is the purpose of this invention to provide a propeller blade pitch change and pitch lock system which will accomplish the above-stated functions and this overall system will now be described.

Hydraulic actuating fluid is available in oil reservoir or sump 70, which is preferably pressurized. Utility or main pump 72, which is the normal hydraulic fluid supply pump, takes hydraulic actuating fluid from sump 70 and passes it through check valve 74 into line 76, through filter 78, which is of the bypass type meaning that should the filter clog, spring 80 would be depressed and unfiltered fluid would pass from line 76 into line 82. From line 82 the hydraulic fluid from utility pump 72 goes through line 84 and into annulus 86 of pilot valve 88 of overspeed topping governor 90. During periods when the propeller is not in an overspeed condition, this main pump pressure remains in annulus 86. In addition to passing through line 84, the hydraulic fluid from main pump 72 may also pass through line 92 into annulus 94 of the spool valve portion 96 which is enclosed within fixed cylinder portion 98 of emergency feathering valve 100. The fluid from main pump 72 then passes through line 102 into pressure regulating and sequencing valve unit 104 which performs the function of providing actuating fluid at a predetermined minimum pressure to pitch lock disarming chamber 54 before permitting fluid to flow to distributor valve 144. With spring 134 forcing piston 132 of sequence valve 104 to its leftward position, hydraulic fluid from line 102 passes through metering port 105 and lines 106, 108, chamber 109, lines 110, 112, annuli 114 and 116 in the pitch lock portion 117 of distributor valve 144, then passes through lines 118 and past manual pitch lock solenoid unit 120 through line 122 into annulus 124 formed between movable piston 126 and stationary cylinder 128 of topping governor cylinder unit 130 thence into line 60 and propeller pitch lock disengaging chamber 54 to disengage pitch lock unit 44. Not until the pressure in chamber 54 reaches a predetermined minimum value, based upon line and cavity sizes and spring forces, does the pressure in chamber 109 reach a value sufficient to overcome spring 134 and force piston 132 rightwardly to permit the flow of hydraulic fluid to distributor valve 144. With spring 134 overcome and piston 132 in its rightward position, hydraulic actuating fluid may pass through line 131 to one side of pressure regulating valve 133 and through line 136 into annular chamber 138 formed between movable piston 140 and stationary cylinder 142 at the pitch change portion 143 of distributor valve 144 from whence it is distributed, in accordance with the position of piston 140 within cylinder 142 of distributor valve 144 as dictated by propeller speed control 250. Pressure reducing and sequencing valve 104, consequently, insures that pitch lock unit 44 is disengaged before it sequences and moves rightwardly to admit main pump hydraulic fluid to distributor valve 144. With piston 132 of pressure regulating and sequencing valve 104 shifted rightwardly, the forces acting on opposite sides thereof, namely the force of spring 134 and the hydraulic fluid in chamber 109, will position piston 132 to vary the area of metering port 105 and hence regulate the pressure in pitch lock chamber 54. Fluid entering annulus 138 of distributor valve 144 may pass either through orifice 150 into propeller low pitch line portion 146 or through orifice 196 into propeller high pitch line portion 190 depending upon the position of piston 140. From low pitch line portion 146, actuating fluid may pass either through line 154 into blind annulus 156, when emergency feathering valve 100 is in its far right position or through line 32 to selector valve 148 to provide propeller low pitch actuating fluid to the opposite side of pressure regulating valve 133 from main pump fluid pressure from line 131 to permit pressure regulating valve 133 to control the pressure drop through orifice 150 by bypassing flow from line 131 through line 135 to sump 70 when the pressure drop through orifice 150 is above the selected value and by reducing or eliminating bypass flow when the pressure drop is below the selected value. The operation of pressure regulating valve is described fully in U.S. Patent No. 2,822,666 in connection with element 76 thereof. The flow then continues through line 32 into low pitch chamber 160 of pitch change motor 24. With low pitch actuating pressure in chamber 160, the high pitch side 162 of pitch change motor 24 is connected to oil reservoir or sump 70 through lines 30, annulus 164, drilled passage 166, annulus 168 of feathering valve 100, then through line 190, chamber 192 of distributor valve 144 and thence through scavenge line 194 to oil sump or reservoir 70.

When distributor valve piston 140 is shifted so as to place annulus 138 into communication with high pitch line 190 through metering orifice 196, the metered main pump hydraulic fluid passes through line 190 and thence through selector valve 148 to pressure regulating valve 133 to permit pressure regulating valve 133 to regulate the pressure drop across orifice 196 in the fashion described supra. The hydraulic fluid in line 190 also passes into annulus 168 of emergency feathering valve 100 thence through drilled passage 166 and annulus 164 into line 30 to the high pitch side cavity 162 of pitch change motor 24.

Low pitch stops 200 normally prevent pitch change motor piston 26 from moving sufficiently far left to rotate blades 12 to reverse pitch for they positively lock the blades out of the destructive zero degree pitch angle area. When it is desired to reverse pitch, by proper placement of pilot lever 202, piston 204 of reversing valve 206 is moved by pulley action to block line 208 of low pitch pressure regulating valve 210 thereby closing the valve and causing low pitch actuating pressure to build up in line 32 and hence in chamber 160 thereby moving piston 212 of low pitch servo valve 214 against the urging of spring 216 so as to permit the low pitch hydraulic fluid to enter line 218 to hydraulic area 220 of low pitch stop piston 222 to remove wedge 224 and permit low pitch stops 200 to pivot inwardly toward axis 16 about their pivot points 226, thereby permitting piston 26 to move far enough to the left to rotate blades 12 into the desired reverse pitch angle.

Emergency feathering valve 100, which may be operated either by pilot lever 202 or pilot panic lever 230, performs the function upon being shifted leftwardly of connecting main pump hydraulic fluid line 82 with passage 166 and hence with high pitch line 30, thereby providing main pump hydraulic fluid to the high pitch side 162 of pitch change motor 24 directly without first passing through distributor valve 144. At the same time, since maximum flow and pressures are desired to effect full blade feather in the minimum possible time, standby pump 232 provides actuating fluid through filter 234, line 236 and annulus 164 into high pitch line 30 where it joins the main pump fluid. Normally the standby pump 232 is operating but its flow is bypassed through annulus 238 into line 240 thence into annulus 242 of distributor valve 144 thence through line 194 to the sump or reservoir 70. Further, check valve 237 and relief valve 239 regulate the pressure in line 236 in known fashion. Levers 202 and 230 shift feathering valve 100 leftwardly to perform the feathering function, by causing cam 320 to rotate clockwise, so that with piston 126 of topping governor cylinder 130 bottomed left due to the action of spring 331, link 308 will rotate clockwise about piston 126, due to the action of roller or pin 310 within eccentric cam 311, and thereby move feathering valve 100 leftwardly.

Propeller speed control unit 250, preferably as a function of engine or propeller parameters, acts through gear system 252 to position distributor valve piston 140 and hence change the pitch angle of the blades 12 of propeller unit 10 so as to cause propeller 10 to rotate at a constant speed. Since propeller resistance to rotation varies with propeller pitch angle, propeller speed may be governed by varying the propeller pitch angle. Propeller speed control 250 is fully described in U. S. Patent No. 2,666,490 or U.S. application Serial No. 508,882, filed May 17, 1955, now Patent No. 2,928,476.

The electric governor 14 shown in U.S. Patent No. 2,666,490 is of the type fully disclosed in U.S. Patent No. 2,517,703. Propeller speed control unit 250 will include a tachometer generator driven by propeller-driven gear 251, which positions a servo motor by sending an electrical impulse to an electrical solenoid. The servo motor in turn drives a gear 252 to position movable distributor valve piston 140 within stationary distributor cylinder 142. Gear 252 drives gear 301, thereby causing shaft 303 to rotate. Cam roller unit 300 is fixed in shaft 303 and received in a cam slot in the left end 307 of distributor valve piston 140. Accordingly, the rotation of gears 252 and 301 cause the translation of distributor piston 140. Distributor valve 144, gear 296, gear 252, shaft 303, gear 301, and roller cam unit 300 correspond, respectively, to the following reference numerals in U.S. Patent No. 2,666,490: 46, 74, 120, 70, 130, and 72.

Governor 250 is calibrated, for example by speeder spring setting, to be actuated for speed correction at some 6-10% lower speed than is overspeed topping governor 90, thereby establishing a speed range in which governor 250 alone will actuate. When this speed range has been exceeded, overspeed topping governor will overrule governor 250 when operative.

In the fashion just described propeller speed control 250 positions distributor valve 144 to meter hydraulic actuating fluid from main pump 72 selectively to pitch change motor 24 and hence vary blade pitch angle to control propeller speed. Under emergency conditions, the pilot may actuate emergency feather valve 100 to connect main pump 72 directly to the high pitch side 162 of pitch change motor 24 and simultaneously supplement utility pump 72 output with standby pump 232 output to effect undelayed feathering. When reverse pitch is desired, the actuation of reversing valve 206 serves to activate low pitch servo 222 to release low pitch stops 200 and thereby permit the pitch change motor to change blade pitch to reverse pitch.

As previously described, during normal operation hydraulic fluid from line 60 enters pitch lock disengaging chamber 54 to keep pitch lock unit 44 disengaged. During periods of propeller malfunction it is desired to have the pitch lock unit 44 engaged. Overspeed topping governor 90 and topping governor cylinder 130 perform this function. When governor flyweights 270 are thrown outwardly due to propeller overspeed, they cause the compression of spring 272 and move governor pilot valve 88 of overspeed topping governor 90 to the left and thereby permit main pump actuating fluid from line 84 to enter line 274 and pass through annulus 276 in reversing valve 206 thence through line 278 into annulus 280 of topping governor cylinder 130 to act as a differential pressure against piston 126 thereof to move the piston to the right. This movement of piston 126 will place line 60 and hence pitch lock disengaging chamber 54 into communication with drain line 282 so that spring 284 will cause sleeve 56 to move to the right causing the engagement of ring gears 50 and 52 of pitch lock unit 44. With pitch lock unit 44 so engaged, propeller unit 10 is capable of increasing blade pitch angle due to a pitch lock ratcheting effect but is incapable, due to pitch lock tooth angularity, of reducing blade pitch angle. In addition to engaging the pitch lock 44, the actuation of overspeed topping governor 90 also actuates feathering valve 100 to connect pump 72 directly to high pitch side 162 of pitch change motor 24 to increase blade pitch to the feather position generally within a few seconds. The aforementioned rightward movement of piston 126 of topping governor cylinder 130 will cause link 308 to rotate clockwise about pivot 310 to move feather valve piston left.

Obviously, a malfunction which caused a general loss of pressure within the control system will also cause pitch lock engagement for spring 284 will move rings 50 and 52 of pitch lock unit 44 into engagement since there will be no fluid pressure resistance in chamber 54.

Pilot manually operated pitch lock solenoid unit 120 is actuatable to move piston 290 thereof to the right thereby permitting pitch lock disengaging chamber 54 to drain to atmosphere through line 60, annulus 124 and line 122 to engage pitch lock unit 44.

Should a malfunction occur so that the rate of change of blade angle of blades 12 does not follow the rate prescribed by distributor valve piston 140 in distributor valve 144, the pitch lock disengaging pressure is drained from chamber 54 in a fashion now to be described and gear rings 52 and 50 engage.

Follow-up gear train 292 which is attached to gear 294 of propeller hub or barrel 14 and also to gear 296 causes the rotation of gear 296 and through the action of cam roller unit 300 causes the translation to the right of piston 140 of distributor valve 144. Since pin 309 connects distributor valve end 307 to shaft 305, thereby causing distributor piston 140 to rotate with gear 296 and hence be translated rightwardly since shaft 303 and cam roller unit 300 are held stationary by gear 252. This rightward movement of piston 140 blocks entry of pitch lock disengaging fluid from line 112 into line 118 and further places line 118, which connects to line 122, annulus 124, line 60 and pitch lock chamber 54, into communication with the sump through passage 302, thereby engaging the pitch lock.

A motion signal from torque splined ring 304 in reduction gear 22 may be used to sense a negative torque condition and, acting through negative torque control 306, will move piston 96 of emergency feathering valve 100 to the left thereby, as previously described, connecting main pump 72 pressure directly to the high pitch side 162 of pitch change motor 24 and also, due to the pivoting action of connecting link 308 about pivot point 310, cause piston 126 of topping governor cylinder 130 moved to the right thereby placing line 60 and hence pitch lock disengaging chamber 54 into communication with the atmospheric sump through line 282 to engage pitch lock unit 44. The negative torque control 306 and the reduction gear splined ring 304 are more fully described in U.S. Patent No. 2,801,701, wherein elements 90—144, 90 and 50 correspond, respectively, to negative torque control 306, gear 304 and feathering valve 100 herein.

Further, either through selected positioning of lever 202 or the actuation of the panic handle 230, each of which may cause actuating cam 320 to rotate counterclockwise with feathering valve 100 bottomed right due to the action of spring 331, thereby causing link 308 to pivot clockwise about pivot point 322 due to the action of pivot boss 310 of link 308 in eccentric groove 311 of cam 320, thereby moving valve 126 of topping governor cylinder 130 to the right to drain pitch lock disengaging chamber lock 54 and engaging pitch lock unit 44.

It will be noted that the pitch lock control system has three valves, namely distributor valve 144, manual solenoid pitch lock valve 120 and topping governor cylinder valve 130 in series in the line providing main pump hydraulic fluid to the hydraulic pitch lock disengaging chamber 54 and that the translation of any of these three valves will engage the pitch lock unit 44.

As mentioned previously it is highly desirable to have the pitch lock unit 44 disengaged when proceeding toward or in the propeller blade reverse pitch region to insure that the pitch lock 44 does not engage in or near the potentially dangerous zero degree blade pitch angle. Accordingly, pilot operated reversing valve 206 is placed in the hydraulic line between the topping governor 90 and topping governor cylinder 130 such that when the pilot lever 202 is moved so as to call for propeller blade reverse pitch, lever 330, due to a pulley connection between pilot lever 202 and pulley 203, is actuated pivotally to move piston 204 of reversing valve 206 to the right, thereby placing line 278 into communication with drain through chamber 322, drilled passage 324 and line 326. This removes the pressurized, metered main pump pressure which has passed through the overspeed topping governor 90, line 274 and line 278 from annulus 280 of topping governor cylinder 130 so that spring 331 retains piston 126 in its far left position, thereby preventing the draining of disengaging actuating fluid from pitch lock disengaging chamber 54. In this fashion, during reverse blade pitch operation, overspeed topping governor 90 and topping governor cylinder 130 are isolated from the remainder of the pitch lock and feathering system and cannot cause pitch lock engaging or feathering.

It is to be understood that the invention is not limited to the specific embodiment herein illustrated and described but may be used in other ways without departure from its spirit as defined by the following claims.

We claim:

1. In a variable pitch propeller unit having an axis and having a plurality of blades supported by a hub unit for rotation therewith about said axis for propulsion purposes and for rotation with respect to said hub for propeller blade pitch change purposes, and further having a pitch lock which connects said blades to said hub when engaged to prevent propeller pitch decrease and which is normally hydraulically disengaged, a hydraulic pitch change motor attached to said hub and said blades to cause rotation therebetween to vary propeller blade pitch, a hydraulically responsive pitch lock disengaging chamber, a main hydraulic fluid pump, a pressure regulating and sequencing valve connected by hydraulic ducting to receive hydraulic fluid from said pump, a distributor valve having a first portion connected by hydraulic ducting to receive hydraulic fluid from said pressure regulating and sequencing valve and a second portion connected by hydraulic ducting to receive hydraulic fluid from said pressure regulating and sequencing valve and with said second portion connected to transmit hydraulic fluid to said pitch change motor to vary propeller blade pitch, a propeller speed control positioning said distributor valve, a manually operated pitch lock engaging valve connected by hydraulic ducting to receive hydraulic fluid from said distributor valve first portion, a propeller overspeed topping governor cylinder positioned between said manually operated pitch lock engaging valve and said pitch lock disengaging chamber and connected by hydraulic ducting to transmit hydraulic fluid therebetween, said pressure regulating and sequencing valve having a first and second path defining hydraulically positioned sequencing piston which is spring biased to a first position wherein hydraulic fluid from said pump is passed thru said piston first path thence, in order, thru said distributor valve first portion, said manually operated pitch lock engaging valve, and said propeller overspeed topping governor cylinder to said pitch lock disengaging chamber to disengage said pitch locks while blocking flow thru said second path, and said piston being hydraulically actuated to a second position when said hydraulic fluid flowing therethru thru said first path to said pitch lock disengaging chamber reaches a preselected value wherein said piston is positioned to define a regulating port area to regulate the pressure of hydraulic fluid passing therethru to said pitch lock disengaging chamber and wherein said pressure regulating and sequencing valve provides main pump hydraulic fluid to said distributor valve second portion thru said piston second path for selective distribution to said pitch change motor depending upon the position of said distributor valve second portion as established by said propeller speed control, said distributor valve, first portion, said manually operated pitch lock engaging valve and said topping governor cylinder being hydraulically connected in series and to said pitch lock disengaging chamber so that the actuation of any one will bleed said pitch lock disengaging chamber and engage said pitch lock, an overspeed topping governor positioned between and connected by hydraulic ducting to said main pump and said topping governor cylinder and actuatable in response to propeller overspeed to provide hydraulic fluid to and to actuate said topping governor cylinder and engage said pitch locks.

2. In a variable pitch propeller unit having an axis and having a plurality of blades supported by a hub unit for rotation therewith about said axis for propulsion purposes and for rotation with respect to said hub for propeller blade pitch change purposes, and further having a pitch lock which connects said blades to said hub when engaged to prevent propeller pitch decrease and which is normally hydraulically disengaged, a hydraulic pitch change motor attached to said hub and said blades to cause rotation therebetween to vary propeller blade pitch, a hydraulically responsive pitch lock disengaging chamber, a main hydraulic fluid pump, a pressure regulating and sequencing valve connected by hydraulic ducting to receive hydraulic fluid from said pump, a distributor valve having a first portion connected by hydraulic ducting to receive hydraulic fluid from said pressure regulating and sequencing valve and a second portion connected by hydraulic ducting to receive hydraulic fluid from said pressure regulating and sequencing valve and with said second portion connected to transmit hydraulic fluid to said pitch change motor to vary propeller blade pitch, a propeller speed control positioning said distributor valve, a manually operated pitch lock engaging valve connected by hydraulic ducting to receive hydraulic fluid from said distributor valve first portion, a propeller overspeed topping governor cylinder positioned between said manually operated pitch lock engaging valve and said pitch lock disengaging chamber and connected by hydraulic ducting to transmit hydraulic fluid therebetween, said pressure regulating and sequencing valve having a first and second path defining hydraulically positioned sequencing piston which is spring biased to a first position wherein hydraulic fluid from said pump is passed thru said piston first path thence, in order, thru said distributor valve first portion, said manually operated pitch lock engaging valve, and said propeller overspeed topping governor cylinder to said pitch lock disengaging chamber to disengage said pitch locks while blocking flow thru said second path and said piston being hydraulically actuated to a second position when said hydraulic fluid flowing therethru thru said first path to said pitch lock disengaging chamber reaches a preselected value wherein said piston is positioned to define a regulating port area to regulate the pressure of hydraulic fluid passing therethru to said pitch lock disengaging chamber and wherein said pressure regulating and sequencing valve provides main pump hydraulic fluid to said distributor valve second portion thru said piston second path for selective distribution to said pitch change motor depending upon the position of said distributor valve second portion as established by said propeller speed control, said distributor valve, first portion, said manually operated pitch lock engaging valve and said topping governor cylinder being hydraulically connected in series and to said pitch lock disengaging chamber so that the actuation of any one will bleed said pitch lock disengaging chamber and engage said pitch lock, an overspeed topping governor positioned between and connected by hydraulic ducting to said main pump and said topping governor cylinder and actuatable in response to propeller overspeed to provide hydraulic fluid to and to actuate said topping governor cylinder and engage said pitch locks, and a reversing valve located in said hydraulic ducting between said propeller overspeed topping governor and said topping governor cylinder which is actuatable during propeller reverse pitch operation to prevent pitch lock engaging by overspeed topping governor actuation of said topping governor cylinder.

3. An engine, a variable pitch propeller unit driven by said engine and having an axis and further having a plurality of blades supported by a hub unit for rotation therewith about said axis for propulsion purposes and for rotation with respect to said hub for propeller blade pitch change purposes, and still further having a ratchet type pitch lock which is normally hydraulically disengaged and which prevents the reduction of propeller blade pitch angle when engaged, a hydraulic pitch change motor attached to said hub and said blades to cause rotation therebetween to vary propeller blade pitch, a hydraulically responsive pitch lock disengaging chamber, a main hydraulic fluid pump, a pressure regulating and sequencing valve connected by hydraulic ducting to receive hydraulic fluid from said pump, a distributor valve having a first portion connected by hydraulic ducting to receive hydraulic fluid from said pressure regulating and sequencing valve and a second portion connected by hydraulic ducting to receive hydraulic fluid from said pressure regulating and sequencing valve and with said second portion connected to transmit hydraulic fluid to said pitch change motor to vary propeller blade pitch, a propeller speed control positioning said distributor valve, a manually operated pitch lock engaging valve connected by hydraulic ducting to receive hydraulic fluid from said distributor valve first portion, a propeller overspeed topping governor cylinder positioned between said manually operated pitch lock engaging valve and said pitch lock disengaging chamber and connected by hydraulic ducting to transmit hydraulic fluid therebetween, said pressure regulating and sequencing valve having a first and second path defining hydraulically positioned sequencing piston which is spring biased to a first position wherein hydraulic fluid from said pump is passed thru said piston first path thence, in order, thru said distributor valve first portion, said manually operated pitch lock engaging valve, and said propeller overspeed topping governor cylinder to said pitch lock disengaging chamber to disengage said pitch locks while blocking flow thru said second path and said piston being hydraulically actuated to a second position when said hydraulic fluid flowing therethru thru said first path to said pitch lock disengaging chamber reaches a preselected value wherein said piston is positioned to define a regulating port area to regulate the pressure of hydraulic fluid passing therethru to said pitch lock disengaging chamber and wherein said pressure regulating and sequencing valve provides main pump hydraulic fluid to said distributor valve second portion thru said piston second path for selective distribution to said pitch change motor depending upon the position of said distributor valve second portion as established by said propeller speed control, means to regulate pressure drop of main pump hydraulic fluid through said distributor valve, said distributor valve, first portion, said manually operated pitch lock engaging valve and said topping governor cylinder being hydraulically connected in series to said pitch lock disengaging chamber so that the actuation of any one will bleed said pitch lock disengaging chamber and engage said pitch lock, a propeller overspeed topping governor hydraulically connected to said main pump and said topping governor cylinder and actuatable in response to propeller overspeed to supply main pump hydraulic fluid to said topping governor cylinder to actuate said topping governor cylinder and engage said pitch locks, a reversing valve located in said hydraulic ducting between said propeller overspeed topping governor and said topping governor cylinder which is actuatable during propeller reverse pitch operation to prevent pitch lock engaging by overspeed topping governor actuation of said topping governor cylinder, a feathering valve located between said main pump and said pressure reducing and sequencing valve and connected by hydraulic ducting to each and to said pitch change motor and which is actuatable to provide main pump hydraulic fluid directly to said pitch change motor to feather said propeller blades, a standby pump hydraulically connected to provide hydraulic fluid to said feathering valve to join said main pump hydraulic fluid flowing to said pitch change motor when said feathering valve is actuated, means connecting said feathering valve to said topping governor cylinder and to actuate said topping governor cylinder to engage said pitch lock in response to actuation of said feathering valve, a pilot control lever connected to and actuating said topping governor cylinder to engage said pitch lock at selected pilot control lever positions, a pilot operated panic handle actuatably connected to actuate said topping governor cylinder to engage said pitch lock, a follow-up control connecting said propeller hub to said distributor valve and actuatable to actuate said distributor valve and engage said pitch lock, negative torque responsive means actuatably connected to said feathering valve to actuate said feathering valve and said topping governor cylinder through said connecting means to engage said pitch lock and feather said propeller blades during periods of negative torque, said standby pump operable to replace said main pump and hydraulically connected to said pitch lock disengaging chamber through the hydraulic system utilized by said main pump hydraulic fluid so that loss of hydraulic fluid in said standby pump hydraulic system engages said pitch lock when said main pump is inoperative.

4. An engine, a variable pitch propeller unit driven by said engine and having an axis and having a plurality of blades supported by a hub unit for rotation therewith about said axis for propulsion purposes and for rotation with respect to said hub for propeller blade pitch change purposes, and further having a ratchet type pitch lock which connects said blades to said hub and which is normally hydraulically disengaged and which prevents the reduction of propeller blade pitch angle when engaged, a pitch change motor hydraulically actuatable to vary propeller blade pitch and having a high pitch and a low pitch side, spring biased means defining a pitch lock disengaging chamber connected to disengage said pitch lock in response to hydraulic pressure, a main pump supplying hydraulic fluid to said pitch lock engaging chamber thru first hydraulic ducting to disengage said pitch lock and thru second hydraulic ducting to said pitch change motor, a sequencing valve hydraulically connected to said main pump and said distributor valve and having a piston which is spring biased to a first position wherein hydraulic fluid may flow thru said first hydraulic ducting while blocking fluid flow thru said second hydraulic ducting and which piston is actuatable in response to hydraulic pressure in said first hydraulic ducting to a second position wherein hydraulic flow may flow thru said first and second hydraulic ducting, a distributor valve located in said first hydraulic ducting to control the flow of hydraulic fluid to said pitch lock disengaging chamber and second hydraulic ducting to selectively control hydraulic flow therethru to said high pitch and said low pitch sides of said pitch change motor, a propeller speed control positioning said distributor valve, said distributor valve being connected by said first and second hydraulic ducting to said main pump, and by said second hydraulic ducting to said pitch change motor and by said first hydraulic ducting to said pitch lock disengaging chamber to distribute hydraulic fluid from said pump to said pitch change motor to vary blade pitch and to said pitch lock disengaging chamber to disengage said pitch lock so that loss of hydraulic fluid pressure will engage said pitch lock, means connected to regulate the pressure drop across said distributor valve in said second hydraulic ducting, a manually operated pitch lock engaging valve and a propeller overspeed topping governor cylinder located in said first hydraulic ducting to control hydraulic fluid flow therethru, said manually operated pitch lock engaging valve, said distributor valve and said topping governor cylinder hydraulically connected in series in said first hydraulic ducting and each connected to drain so that actuation of each will engage said pitch lock, an emergency feathering valve hydraulically connected between said main pump and said distributor valve and said pitch change motor high pitch side and normally positioned to deliver hydraulic fluid from said main pump to said distributor valve and actuatable to provide hydraulic fluid directly from said main pump to said pitch change motor high pitch sides to feather said blades, a standby pump connected to said pitch change motor high pitch side and actuatable to increase hydraulic fluid flow therethru when said emergency feathering valve is actuated, propeller malfunction responsive means actuatably connected to said feathering valve to actuate said feathering valve to feather said propeller blades during periods of said propeller malfunction, a propeller overspeed actuated topping governor hydraulically connected between said main pump and said topping governor cylinder so that propeller overspeed actuation of said governor will provide actuating fluid to actuate said governor cylinder to bleed said pitch lock disengaging chamber and engage said pitch lock, first means connecting said overspeed topping governor cylinder to said emergency feathering valve so that actuation of said overspeed topping governor cylinder by said overspeed topping governor will actuate said emergency feather valve and so that actuation of said emergency feather valve by said propeller malfunction responsive means will actuate said overspeed topping governor cylinder, a reversing valve located hydraulically between said propeller overspeed topping governor and said topping governor cylinder which is actuatable during propeller reverse pitch operation to prevent pitch lock engaging by overspeed topping governor actuation of said topping governor cylinder and propeller blade feathering by emergency feathering actuation by said propeller malfunction responsive means, a pilot control lever, means connecting said pilot control lever to said overspeed topping governor cylinder and said emergency feathering valve so that said overspeed topping governor cylinder may be actuated independently of said emergency feathering valve thereby and so that said emergency feathering valve may be actuated independently of said overspeed topping governor cylinder thereby, a pilot operated panic handle, means connecting said pilot operated panic handle to said overspeed topping governor cylinder and said emergency feathering valve so that said overspeed topping governor cylinder may be actuated independently of said emergency feathering valve thereby and so that said emergency feathering valve may be actuated independently of said overspeed topping governor cylinder thereby, a follow-up control connecting said propeller hub to said distributor valve and actuatable to actuate said distributor valve to engage said pitch lock when said propeller is not responding correctly to said propeller speed control.

5. In a variable pitch propeller unit having an axis and having a plurality of blades supported by a hub unit for rotation therewith about said axis for propulsion purposes and for rotation with respect to said hub for propeller blade pitch change purposes, and further having a pitch lock which is normally hydraulically disengaged so that loss of hydraulic pressure will engage said pitch lock, a pitch lock disengaging chamber connected to disengage said pitch lock in response to hydraulic actuation, a hydraulic pitch change motor attached to said hub and said blades to cause rotation therebetween to vary propeller blade pitch, a main pump connected by conduit means to supply hydraulic fluid to said pitch change motor and said pitch lock disengaging chamber, a propeller speed control positioned distributor valve, a manually operated pitch lock engaging valve and a propeller overspeed topping governor cylinder located in said conduit means between said main pump and said pitch lock disengaging chamber and being hydraulically connected in series so that the actuation of any one will bleed said pitch lock disengaging chamber and engage said pitch lock.

6. In a variable pitch propeller unit having an axis and having a plurality of blades supported by a hub unit for rotation therewith about said axis for propulsion purposes and for rotation with respect to said hub for propeller blade pitch change purposes and further having a pitch lock unit, spring biased means defining a pitch lock disengaging chamber connected to disengage said pitch lock in response to hydraulic pressure, a main pump supplying hydraulic fluid to said pitch lock disengaging chamber thru hydraulic ducting to disengage said pitch lock and so that loss of hydraulic fluid pressure will engage said pitch lock, a propeller speed control, a distributor valve positioned by said propeller speed control and located in said hydraulic ducting to control hydraulic fluid flow therethru, a manually operated pitch lock engaging valve and a propeller overspeed topping governor cylinder located in said hydraulic ducting to control hydraulic fluid flow therethru, said manually operated pitch lock engaging valve and said topping governor cylinder and said distributor valve connected to drain so that actuation of any thereof will bleed said pitch lock disengaging chamber to engage said pitch lock, a propeller overspeed actuated topping governor connected to said propeller and said topping governor cylinder so that propeller overspeed actuation of said governor will actuate said governor cylinder to bleed said pitch lock disengaging chamber and engage said pitch lock, a pilot control lever connected to actuate said topping governor cylinder to engage said pitch lock at selected pilot control lever positions, a pilot operated panic handle connected to actuate said topping governor cylinder to engage said pitch lock, a follow-up control connecting said propeller hub to said distributor valve and actuatable to actuate said distributor valve to engage said pitch lock when said propeller is not responding correctly to said propeller speed control, means responsive to propeller torque generation and connected to actuate said topping governor cylinder during periods of said propeller torque generation.

7. In a variable pitch propeller unit having an axis and having a plurality of blades supported by a hub unit for rotation therewith about said axis for propulsion purposes and for rotation with respect to said hub for propeller blade pitch change purposes, and further having a pitch lock which connects said blades to said hub and which is normally hydraulically disengaged, a pitch change motor hydraulically actuatable to vary propeller blade pitch and having a high pitch and a low pitch side, spring biased means defining a pitch lock disengaging chamber connected to disengage said pitch lock in response to hydraulic pressure, a main pump supplying hydraulic fluid to said pitch lock engaging chamber thru first hydraulic ducting to disengage said pitch lock and thru second hydraulic ducting to said pitch change motor, a distributor valve located in said second hydraulic ducting to selectively control hydraulic flow therethru to said high pitch and said low pitch sides of said pitch change motor, a propeller overspeed topping governor cylinder located in said first hydraulic ducting to control hydraulic fluid flow therethru, an emergency feathering valve hydraulically connected between said main pump and said pitch change motor high pitch side and normally positioned to deliver hydraulic fluid from said main pump to said distributor valve and actuatable to provide hydraulic fluid directly from said main pump to said pitch change motor high pitch side to feather said blades, means connecting said emergency feathering valve to said overspeed topping governor cylinder so that they will actuate simultaneously, a propeller overspeed actuated topping governor hydraulically connected between said main pump and said topping governor cylinder so that propeller overspeed actuation of said governor will actuate said governor cylinder to bleed said pitch lock disengaging chamber and engage said pitch lock and actuate said emergency feathering valve through said connecting means to feather said propeller blades, means responsive to propeller torque generation connected to actuate said feathering valve and said topping governor cylinder through said connecting means to engage said pitch lock and feather said propeller blades during periods of propeller torque generation.

8. In a variable pitch propeller unit having an axis and having a plurality of blades supported by a hub unit for rotation therewith about said axis for propulsion purposes and for rotation with respect to said hub for propeller blade pitch change purposes, and further having a pitch lock which connects said blades to said hub and which is normally hydraulically disengaged, a pitch change motor hydraulically actuatable to vary propeller blade pitch and having a high pitch and a low pitch side to vary propeller blade pitch between reverse pitch and feather, spring biased means defining a pitch lock disengaging chamber connected to disengage said pitch lock in response to hydraulic pressure, a main pump supplying hydraulic fluid to said pitch lock engaging chamber thru first hydraulic ducting to disengage said pitch lock and thru second hydraulic ducting to said pitch change motor, a distributor valve located in said second hydraulic ducting to selectively control hydraulic flow therethru to said high pitch and said low pitch sides of said pitch change motor, a propeller overspeed topping governor cylinder located in said first hydraulic ducting to control hydraulic fluid flow therethru, an emergency feathering valve hydraulically connected between said main pump and said pitch change motor high pitch side and normally positioned to deliver hydraulic fluid from said main pump to said distributor valve thru said second hydraulic ducting and actuatable to provide hydraulic fluid directly from said main pump to said pitch change motor high pitch side to feather said blades, means connecting said emergency feathering valve to said overspeed topping governor cylinder so that they will actuate simultaneously, a propeller overspeed actuated topping governor hydraulically connected between said main pump and said topping governor cylinder so that propeller overspeed actuation of said governor will actuate said governor cylinder to bleed said pitch lock disengaging chamber and engage said pitch lock and actuate said emergency feathering valve through said connecting means to feather said propeller blades, a reversing valve located hydraulically between said propeller overspeed topping governor and said topping governor cylinder which is actuatable during propeller reverse pitch operation to prevent pitch lock engaging by overspeed topping governor actuation of said topping governor cylinder and propeller blade feathering by emergency feathering actuation by said propeller torque generation responsive means, means responsive to propeller torque generation connected to actuate said feathering valve and said topping governor cylinder through said connecting means to engage said pitch lock and feather said propeller blades during periods of said propeller torque generation.

9. In a variable pitch propeller unit having an axis and having a plurality of blades supported by a hub unit for rotation therewith about said axis for propulsion purposes and for rotation with respect to said hub for propeller blade pitch change purposes, and further having a pitch lock which connects said blades to said hub and which is normally hydraulically disengaged, a pitch change motor hydraulically actuatable to vary propeller blade pitch and having a high pitch and a low pitch side, spring biased means defining a pitch lock disengaging chamber connected to disengage said pitch lock in response to hydraulic pressure, a main pump supplying hydraulic fluid to said pitch lock engaging chamber thru first hydraulic ducting to disengage said pitch lock and thru second hydraulic ducting to said pitch change motor, a distributor valve located in said second hydraulic ducting to selectively control hydraulic flow therethru to said high pitch and said low pitch sides of said pitch change motor, a propeller overspeed topping governor cylinder located in said first hydraulic ducting to control hydraulic fluid flow therethru, a feathering valve hydraulically connected between said main pump and said pitch change motor and normally positioned to deliver hydraulic fluid from said main pump to said distributor valve thru said second hydraulic ducting and actuatable to provide hydraulic fluid directly from said main pump to said pitch change motor to feather said blades, a pilot control lever, means connecting said pilot control lever to said overspeed topping governor cylinder and said emergency feathering valve so that said overspeed topping governor cylinder may be actuated independently of said emergency feathering valve thereby and so that said emergency feathering valve may be actuated independently of said overspeed topping governor cylinder thereby, a pilot operated panic handle, means connecting said pilot operated panic handle to said overspeed topping governor cylinder and said emergency feathering valve so that said overspeed topping governor cylinder may be actuated independently of said emergency feathering valve thereby and so that said emergency feathering valve may be actuated independently of said overspeed topping governor cylinder thereby.

References Cited in the file of this patent

UNITED STATES PATENTS

| | | |
|---|---|---|
| 2,556,700 | Moore | June 12, 1951 |
| 2,703,148 | Pearl | Mar. 1, 1955 |
| 2,801,701 | Coar | Aug. 6, 1957 |